US010839217B2

(12) United States Patent
Badalamenti et al.

(10) Patent No.: US 10,839,217 B2
(45) Date of Patent: *Nov. 17, 2020

(54) AUGMENTED REALITY ASSISTED PICKUP

(71) Applicant: Uber Technologies, Inc., San Francisco, CA (US)

(72) Inventors: John Conway Badalamenti, San Francisco, CA (US); Joshua Inch, Seattle, WA (US); Christopher Michael Sanchez, San Francisco, CA (US); Theodore Russell Sumers, San Francisco, CA (US)

(73) Assignee: Uber Technologies, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/536,024

(22) Filed: Aug. 8, 2019

(65) Prior Publication Data

US 2019/0362153 A1   Nov. 28, 2019

Related U.S. Application Data

(63) Continuation of application No. 16/020,118, filed on Jun. 27, 2018, now Pat. No. 10,423,834.

(Continued)

(51) Int. Cl.
*G06T 19/00* (2011.01)
*G06K 9/00* (2006.01)
(Continued)

(52) U.S. Cl.
CPC ...... *G06K 9/00671* (2013.01); *G06K 9/00711* (2013.01); *G06T 19/006* (2013.01);
(Continued)

(58) Field of Classification Search
None
See application file for complete search history.

(56) References Cited

U.S. PATENT DOCUMENTS 9,494,938 B1 * 11/2016 Kemler ................ G05D 1/0088
9,501,873 B2   11/2016 Salter et al.
(Continued)

FOREIGN PATENT DOCUMENTS

EP          3 038 061 A1    6/2016

OTHER PUBLICATIONS

Timokhina, V., ("How to Develop a Taxi Booking App like Uber," Eastern Peak, Jan. 27, 2017, 30 pages, https://easternpeak.com/blog/how-to-develop-a-taxi-booking-app-like-uber (Year: 2017).*
(Continued)

*Primary Examiner* — Nicholas R Wilson
(74) *Attorney, Agent, or Firm* — Fenwick & West LLP (57) ABSTRACT

A network system, such as a transport management system, uses augmented reality (AR) to identify an approaching vehicle. Responsive to receiving a trip request, a trip management module matches the rider with an available driver and instructs a trip monitoring module to monitor the location of the driver's vehicle as it travels to the pickup location. When the driver's vehicle is within a threshold distance of the pickup location, an AR control module instructs the rider client device to begin a live video stream and instructs an image recognition module to monitor the video stream for the driver's vehicle. Responsive to the driver's vehicle entering the field of view of the camera on the rider client device, the AR control module selects computer-generated AR elements and instructs the rider client device to visually augment the video stream to identify the driver's vehicle as it approaches the pickup location.

14 Claims, 5 Drawing Sheets

Related U.S. Application Data (60) Provisional application No. 62/553,055, filed on Aug. 31, 2017.

(51) Int. Cl.
*H04B 17/318* (2015.01)
*H04B 17/27* (2015.01)
*H04B 17/373* (2015.01)

(52) U.S. Cl.
CPC ........... *H04B 17/27* (2015.01); *H04B 17/318* (2015.01); *H04B 17/373* (2015.01); *G06K 2209/23* (2013.01)

(56) References Cited

U.S. PATENT DOCUMENTS

| | | |
|---|---|---|
| 2014/0267411 A1 | 9/2014 | Fein et al. |
| 2016/0169687 A1 | 6/2016 | Yu |
| 2017/0115125 A1* | 4/2017 | Outwater .............. H04W 4/40 |
| 2017/0343375 A1* | 11/2017 | Kamhi .................... H04W 4/40 |
| 2018/0039917 A1* | 2/2018 | Buttolo .............. G01C 21/3438 |
| 2018/0096445 A1* | 4/2018 | Eyler ................. G01C 21/3438 |
| 2019/0017839 A1 | 1/2019 | Eyler et al. |

OTHER PUBLICATIONS

Hawkins, A. J., "Uber has a colorful new way to prevent awkward car mixups," Dec. 3, 2015, 3 pages, [Online] [Retrieved on Sep. 16, 2018] Retrieved from the Internet <URL: https://www.theverge.com/2015/12/3/9842092/uber-spot-color-rider-driver-mixups-seattle>.

PCT International Search Report and Written Opinion, PCT Application No. PCT/IB2018/056256, dated Jan. 2, 2019, 14 pages.

Timokhina, V., "How to Develop a Taxi Booking App like Uber," Eastern Peak, Jan. 27, 2017, 30 pages. [Online] [Retrieved from the internet on Oct. 16, 2018] Retrieved from <URL: https://easternpeak.com/blog/how-to-develop-a-taxi-booking-app-like-uber>.

\* cited by examiner

AUGMENTED REALITY ASSISTED PICKUP

CROSS-REFERENCE TO RELATED APPLICATIONS

This application is a continuation of U.S. application Ser. No. 16/020,118, filed Jun. 27, 2018, which claims the benefit of U.S. Provisional Application No. 62/553,055, filed Aug. 31, 2017, which is incorporated by reference in its entirety.

BACKGROUND

The described embodiments generally relate to the field of network systems, and, more particularly, to using augmented reality to illustrate a location of an approaching vehicle.

Network systems, such as transport management systems, provide support for logistical issues in managing the transportation of people, cargo, or the like. In some systems, a driver provides transportation services to a rider to a location selected by the rider. Typically, a rider is informed only of a driver's name, vehicle type, and license plate and must rely on the received information to identify the driver's vehicle as it approaches the pickup location. However, a rider may strain to read the license plate and identify the make and model of a vehicle to determine whether an approaching vehicle is driver. Further, in instances where multiple drivers with similar looking or identical vehicles are approaching a pickup location, the rider might inadvertently enter the wrong vehicle, assuming it to be the driver. This may lead to inefficiencies in the pickup process, particularly in densely populated pickup areas, and may cause frustration to the parties and delay the trip.

SUMMARY

To enable a more efficient pickup of a rider, a network system tracks the location of a driver's vehicle and uses augmented reality (AR) to identify the vehicle as it approaches the pickup location.

A trip management module receives, through a rider application, rider input comprising a set of service data. In one embodiment, the service data includes at least an origin location, a request for a driver associated with the network system to transport the rider from the origin location, and optionally, a destination location and a desired departure time. The origin location is a physical location over a threshold radius and/or with predetermined boundaries (e.g., San Francisco International Airport) and encompasses one or more pickup locations (e.g., a two meter-long stretch of curb where the driver stops and the rider enters the vehicle).

Responsive to receiving the request for service, the trip management module matches the rider with one of a plurality of available drivers and sends an invitation message to a driver client device inviting the driver to fulfill the request. If the driver accepts the invitation message, the trip management module instructs a trip monitoring module to monitor the driver's location as she travels from her current location to the pickup location.

The trip monitoring module receives information from a location determination module on the driver client device during the duration of the trip and notifies an AR control module when the driver client device (and thus the driver's vehicle) is within a threshold distance of the pickup location. The AR control module sends an instruction to the rider client device to begin displaying a live video feed using the camera on the rider client device and queries a driver data store for information regarding the driver and the driver's vehicle (e.g., the make, model, and color of the vehicle, the license plate state and number, and the driver's name and/or photograph, etc.).

Responsive to receiving the driver information, the AR control module sends the information to an image recognition module, along with an instruction to monitor the live video feed for the driver's vehicle. The image recognition module uses a trained model to predict a likelihood that an approaching vehicle is the driver's vehicle by calculating a vehicle score based in part on the driver information. In some embodiments, the vehicle score is also based on a comparison of the current time and the driver's estimated time of arrival (DETA) at the pickup location, illumination of an indication device with a rider-specified output configuration, and/or the presence of trade dress associated with the network system.

Responsive to the vehicle score for an approaching vehicle exceeding a vehicle score threshold, the image recognition device determines that an approaching vehicle is the driver and notifies the AR control module, which generates computer-generated AR elements identifying the driver's vehicle and instructs an AR application to overlay the generated elements onto the display. As the vehicle progresses along the route to the pickup location (i.e., as the content in the field of view changes), the AR control module updates the AR elements to notify the rider of the driver's location.

DETAILED DESCRIPTION

The Figures and the following description describe certain embodiments by way of illustration only. One skilled in the art will readily recognize from the following description that alternative embodiments of the structures and methods illustrated herein may be employed without departing from the principles described herein. Reference will now be made to several embodiments, examples of which are illustrated in the accompanying figures. It is noted that wherever practicable similar or like reference numbers may be used in the figures and may indicate similar or like functionality.

Figure 1:
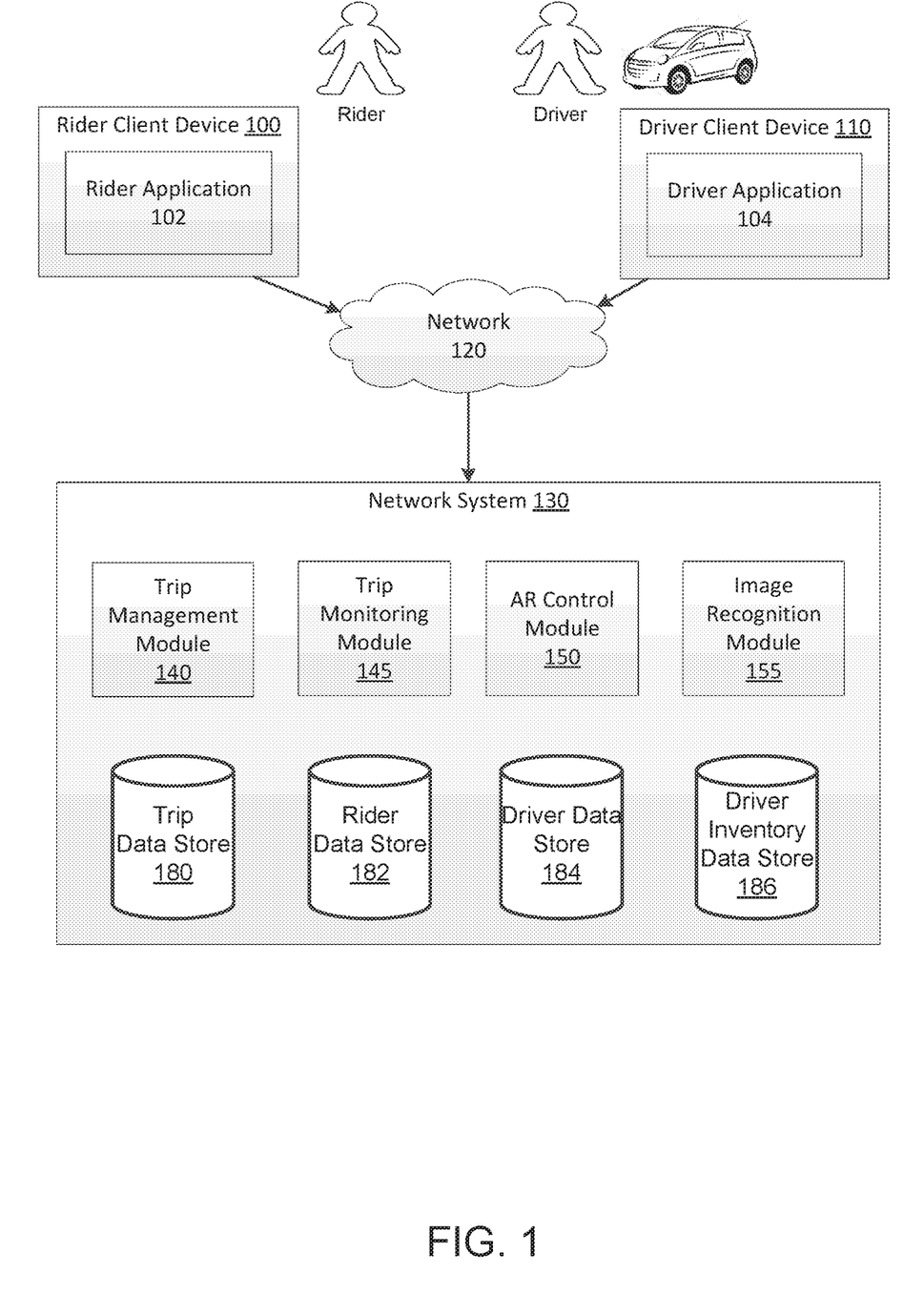
FIG. 1 illustrates the system environment for an example network system, in accordance with an embodiment.

Turning now to the specifics of the system architecture, FIG. 1 illustrates a system environment for an example network system 130. In the example of FIG. 1, the network system 130 coordinates the transportation of persons and/or goods/items for a user (e.g., such as a rider) by a service provider (e.g., a driver of a vehicle). The driver uses a vehicle to provide the transportation to the rider. In this example embodiment, the network system 130 includes a trip management module 140, a trip monitoring module 145, an AR control module 150, an image recognition module 155, and various data stores including a trip data store 180, a rider data store 182, a driver data store 184, and a driver inventory data store 186. These modules and data stores are not native components of a generic computer system, and provide structures and functions beyond generic functions of a computer system, as further described below.

A rider operates a client device 100 that executes a rider application 102 that communicates with the network system 130. The rider operates the rider application 102 to view information about the network service 130, and to make a request for service from the network system 130 for a delivery or transport service ("a trip") of the rider (and, optionally, additional persons) and/or items, for example cargo needing transport. The rider application enables the rider to specify an origin location and/or a destination location associated with the trip. An origin location and/or destination location may be a location inputted by the rider or may correspond to the current location of the rider client device 100 as determined automatically by a location determination module (not shown) in the rider client device 100, e.g., a global positioning system (GPS) component, a wireless networking system, or a combination thereof. For purposes of simplicity, as described herein, an origin location can include a pickup location for service (i) determined by the rider application 102 (e.g., based on the current location of the rider client device 100 using a GPS component), (ii) specified or selected by the rider, or (iii) determined by the network system 130.

According to examples herein, the rider client device 100 can transmit a set of data (e.g., referred to herein as "service data") to the network system 130 over the network(s) 120 in response to rider input or operation of the rider application 102. Such service data can be indicative of the rider's interest in potentially requesting service (e.g., before actually confirming or requesting the service). For example, the rider may launch the rider application 102 and specify an origin location and/or a destination location to view information about the network service before making a decision on whether to request service. The rider may want to view information about the average or estimated time of arrival for pick up by a driver, the estimated time to the destination, the price, the available service types, etc. Depending on implementation, the service data can include the origin and/or destination location information, rider information (e.g., identifier), application information (e.g., version number), device identifier or type, etc. According to some examples, each time the rider modifies the origin and/or destination location, the rider application 102 can generate and transmit the service data to the network system 130.

Once the rider confirms or orders a service via the rider application 102, the rider application 102 can generate data corresponding to a request for the service through the network system 130 (e.g., also referred to herein as a "trip request"). Responsive to receiving a trip request, the network system 130 uses information from the trip request to match the rider with one of a plurality of available drivers. Depending on implementation, the trip request can include rider or device information (e.g., a rider identifier, a device identifier), a service type (e.g., vehicle type) and/or an origin location, a destination location, a payment profile identifier, and/or other data. In some embodiments, the network system 130 selects a driver from a set of drivers, such as based on the driver's current location and status (e.g., offline, online, available, etc.) and/or information from the trip request (e.g., service type, origin location, and/or destination location), to provide the service for the rider and transport the rider from the origin location to the destination location. Alternatively, the network system 130 selects an autonomous vehicle to transport the rider to the destination location. For convenience, this disclosure describes an embodiment in which the vehicle is operated by a driver. However, embodiments described herein may be adapted for vehicles that do not necessarily need to be operated by a person. Responsive to selecting an available driver or vehicle, the network system 130 sends an invitation message to the driver client device 110 inviting the driver to fulfill the trip request.

The driver operates a client device 110 executing a driver application 104 that communicates with the network system 130 to provide information indicating whether the driver is available or unavailable to provide transportation services to riders. The driver application 104 can also present information about the network system 130 to the driver, such as invitations to provide service, navigation instructions, map data, etc. In one embodiment, the driver application 104 enables the driver to provide information regarding availability of the driver by logging into the network system 130 and activating a setting indicating that they are currently available to provide service. The driver application 104 also provides the current location of the driver or the driver client device 110 to the network system 130. Depending on implementation, the current location may be a location inputted by the driver or may correspond to the current location of the driver client device 110 as determined automatically by a location determination module (not shown) in the driver client device 110 (e.g., a GPS component, a wireless networking system, or a combination thereof. The driver application 104 further allows a driver to receive, from the trip management module 140, an invitation message to provide a service for a requesting rider, and if the driver accepts via input, the driver application 104 can transmit an acceptance message to the trip management module 140. The trip management module 140 can subsequently provide information about the driver to the rider application 102. As another embodiment, the driver application 104 can enable the driver to view a list of current trip requests and to select a particular trip request to fulfill. The driver application 104 can also receive routing information from the trip management module 140. The driver application 104 enables a driver to provide a rating for a rider upon completion of a trip. In one embodiment, the rating is provided on a scale of one to five, five being the maximal (best) rating.

The rider client device 100 and the driver client device 110 are portable electronic devices such as smartphones, tablet devices, wearable computing devices (e.g., smartwatches) or similar devices. Alternatively, the driver client device 110 can correspond to an on-board computing system of a vehicle. Client devices typically have one or more processors, memory, touch screen displays, wireless networking system (e.g., IEEE 802.11), cellular telephony support (e.g., LTE/GSM/UMTS/CDMA/HSDPA, etc.), and location determination capabilities.

The rider client device 100 and the driver client device 110 can visually augment captured video streams and/or images using AR. AR augments views of a physical, real-world environment with computer-generated elements (e.g., images, video, text, graphics, etc.). The client devices 100 and 110 use an inertial measuring unit (IMU) to measure the velocity, orientation, and gravitational forces on the client devices 100 and 110. In one embodiment, AR functionality is executed via an AR application on the client devices 100 and 110. The AR application can be a standalone application on the client devices 100 and 110 or a plug-in to the rider application 102 and driver application 104. In other embodiments, a head-mounted display (HMD) is connected to the client devices 100 and 110 via a wireless communication protocol such as Bluetooth and is used to display the AR video stream and/or images.

The rider client device 100 and the driver client device 110 interact with the network system 130 through client applications configured to interact with the network system 130. The applications 102 and 104 of the rider client device 100 and the driver client device 110, respectively, can present information received from the network system 130 on a rider interface, such as a map of the geographic region, and the current location of the rider client device 100 or the driver client device 110. The applications 102 and 104 running on the rider client device 100 and the driver client device 110 can determine the current location of the device and provide the current location to the network system 130.

The trip management module 140 is configured as a communicative interface between the rider application 102, the driver application 104, and the various modules and data stores in the network system 130, and is one means for performing this function. The trip management module 140 is configured to receive driver availability status information and current location information from the driver application 104 and update the driver inventory data store 186 with the availability status. The trip management module 140 is also configured to receive trip requests from the rider application 102 and creates corresponding trip records in the trip data store 180. According to an example, a trip record corresponding to a trip request can include or be associated with a trip ID, a rider ID, an origin location, a destination location, a service type, pricing information, and/or a status indicating that the corresponding trip request has not been processed. According to one example, when a driver accepts the invitation message to service the trip request for the rider, the trip record can be updated with the driver's information as well as the driver's location and the time when the trip request was accepted. Similarly, location and time information about the service as well as the cost for the service can be associated with the trip record.

In one embodiment, during the trip, the trip monitoring module 145 receives information (e.g., periodically) from a location determination module (not shown) on the driver client device 102 indicating the location of the driver's vehicle and/or telematics information (e.g., indications of current speed, acceleration/deceleration, events, stops, and so forth). The trip monitoring module 145 stores the information in the trip data store 180 and can associate the information with the trip record. In some embodiments, the trip monitoring module 145 periodically calculates the DETA at the pickup location and provides the DETA to the rider application 102.

As the driver's vehicle approaches the pickup location, the trip monitoring module 145 determines when the vehicle is within a threshold distance (e.g., 100 meters) of the pickup location and notifies the AR control module 150 of the current location and speed of the vehicle. The AR control module 150 is responsible for generating computer-generated AR elements (e.g., images, video, text, graphics, etc.) to display on the rider client device 100 based on the location of the driver's vehicle and the geographic location, camera direction, and tilt of the rider client device 100, as determined by the IMU. For example, the camera direction and tilt can be used to determine whether the direction and angle at which the camera is pointing would capture an image that included the driver's vehicle and should thus be augmented by associated AR elements.

Responsive to receiving the notification from the trip monitoring module 145, the AR control module 150 instructs the rider client device 100 to initiate a live video feed using the camera on the rider client device 100 and to begin displaying the captured feed on the display. In one embodiment, the AR control module 150 queries the rider through the rider application 102 to allow the rider to opt-in to AR vehicle identification. In other embodiments, the AR control module 150 automatically instructs the rider client device 100 to display the live video feed responsive to the trip monitoring module 145 notifying the AR control module 150 that the driver's vehicle is within a threshold distance of the pickup location.

Additionally, in some embodiments, responsive to determining that the driver's vehicle is within a threshold distance of the pickup location, the AR control module 150 instructs the rider client device 100 and the driver client device 110 to begin communicating with each other by transmitting signals that are detected by the other device and reported to the AR control module 150. In one embodiment, the signals include radio signals such as Wi-Fi or Bluetooth signals. For example, the driver client device 110 might transmit a Bluetooth signal comprising a unique beacon ID. The rider client device 100 located at the pickup location detects the signal and reports the beacon ID to the AR control module 150, which detects the beacon ID as associated with the driver client device 110 and monitors the location of the driver client device 110 as approaches the pickup location (i.e., as the signal strength increases). In other embodiments, the AR control module 150 sends the beacon IDs to the rider client device 100 and the driver client device 110 such that the rider client device 100 and the driver client device 110 recognize the beacon ID associated with the other device when the devices are within a threshold distance of each other.

The AR control module 150 queries the driver data store 184 for driver information associated with the driver and the driver's vehicle. In one embodiment, the driver information includes at least the year, make, model, color, and license plate of the driver's vehicle as well as the driver's name, photograph, and/or rating. In some embodiments, the driver information further includes a designation of whether the driver is associated with an indication device that is capable of providing illumination, displaying content, and/or outputting audio and that can be positioned or fashioned on or within the driver's vehicle. Using an indication device to identify a driver based on a specified output configuration is described further in U.S. patent application Ser. No. 14/604,573, filed on Jan. 23, 2015, U.S. patent application Ser. No. 15/342,072, filed on Nov. 2, 2016, U.S. patent application Ser. No. 15/615,678, filed on Jun. 6, 2017, and PCT Application No. PCT/US15/14406, filed on Feb. 4, 2015, which are hereby incorporated by reference in their entirety.

The AR control module 150 sends the driver information to an image recognition module 155 along with an instruction to monitor the live video feed to identify the driver's vehicle as it enters the line of sight of the rider client device 100. The image recognition module 155 uses machine learning techniques to train a model configured to predict a likelihood that an approaching vehicle is the driver's vehicle. The model determines a vehicle score based on the make, model, and color of an approaching vehicle and the license plate state and number. In some embodiments, the vehicle score is also based on the presence or absence of trade dress associated with the network system and/or illumination of an indication device on the driver's vehicle. For example, an approaching vehicle might receive a high vehicle score if the make, model, and color of the vehicle match the driver information and the image recognition module 155 determines that the license plate state and number of the approaching vehicle match the license plate state and number of the driver's vehicle. Conversely, an approaching vehicle might receive a low score if the approaching vehicle is a different color and has a different license plate state and number than the driver's vehicle, even if the approaching vehicle is the same make and model and has trade dress associated with the network system.

Figure 3:
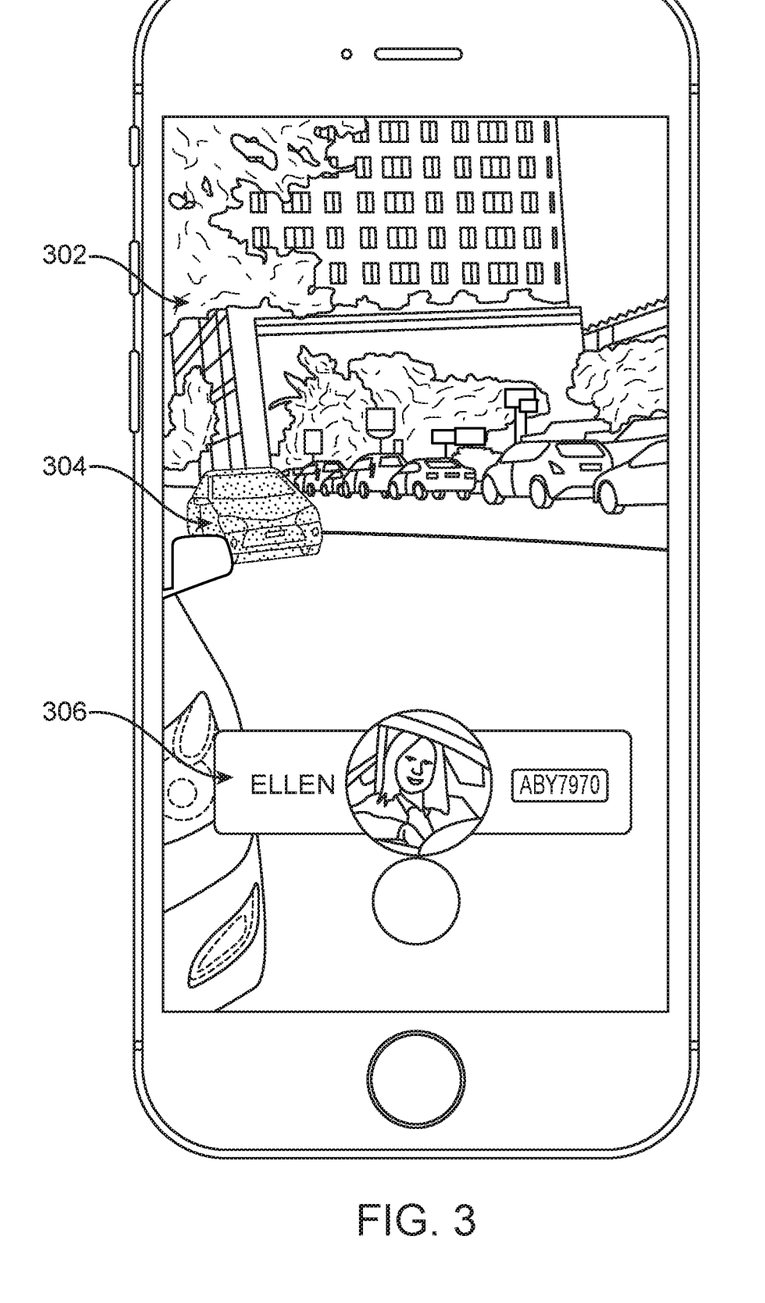
FIG. 3 illustrates an example captured image augmented with AR identification of an approaching vehicle, in accordance with an embodiment.

Responsive to determining that the vehicle score for an approaching vehicle exceeds a vehicle score threshold, the image recognition module 155 determines that the approaching vehicle is the driver's vehicle and notifies the AR control module 150 of the vehicle's location. The AR control module 150 uses the location of the driver's vehicle, and optionally, the received signal strength (RSS) of the radio signals, to generate AR elements to display on the rider client device 100. In one embodiment, the AR elements include a graphical overlay in the shape of the driver's vehicle (as shown in FIG. 3) to highlight the vehicle as it approaches the pickup location. Additionally or alternatively, the AR elements include other graphical and textual elements (e.g., text indicating the driver's name and/or rating and/or the driver's photograph). In still other embodiments, the AR elements also include a graphical representation of the indication device configured in a personalized output configuration. For example, if the rider has specified a color, pattern, or sequence of lights, the AR control module 150 generates an AR element matching the specified configuration.

The AR control module 150 instructs the AR application on the rider client device 100 to overlay the AR elements onto the display. As the driver's vehicle progresses through the line of sight of the rider client device 100, the AR control module 150 updates the AR elements based on the driver's current position and instructs the AR application to display the elements until the driver's vehicle reaches the pickup location. In some embodiments, the pickup location is designated by an AR location marker and/or text elements indicating that the driver has reached the pickup location. Once the driver has reached the pickup location, the AR control module 150 instructs the AR application to display navigational elements (e.g., arrows) directing the rider to the driver's vehicle as well as textual elements including the driver's name, rating, and/or the distance from the rider's current location to the driver's vehicle. Additionally, in some embodiments, the AR control module 150 instructs the AR application to continue to display a graphical representation of the indication device (e.g., by overlaying a blue light on the vehicle).

The trip data store 180 maintains a record of each in-progress and completed trip coordinated by the network system 130. More specifically, each trip provided by a driver to a rider is characterized by a set of attributes (or variables), which together form a trip record that is stored in the trip data store 180. The attributes describe aspects of the driver, the rider, and the trip. In one embodiment, each trip record includes a trip identifier (ID), a rider ID, a driver ID, the origin location, the pickup location, the destination location, the duration of the trip, the service type for the trip, estimated time of pick up, actual time of pickup, and driver rating by rider, rider rating by driver, price information, market information, and/or other environmental variables as described below. The variables for the trip record are thus drawn from multiple sources, including the rider's master and usage records in the rider data store 182, the driver's master and operational records in the driver data store 184, and specific variables captured and received during each trip.

The driver data store 184 stores account and operational information for each driver who participates in the network system 130. For each driver, the driver data store 184 stores one or more database records associated with the driver, including both master data and usage data. In some examples, master data for a driver includes the driver's name, driver's photograph, driver's license information, insurance information, driver vehicle information (year, make, model, vehicle ID, license plate), address information, cell phone number, payment information (e.g., credit card number), sign-up date, driver service type (regular, luxury, van, etc.), device type (e.g., type of cell phone), platform type (e.g., iOS, Android), application ID, and/or application version for the driver application 104). In some embodiments, the database record for a driver further includes a designation of whether the driver is associated with an indication device and/or a beacon ID associated with the driver client device 110.

The driver inventory data store 186 stores driver availability status information received from the trip management module 140, including whether the driver is available for matching and the location of the driver (which gets updated periodically). When the trip management module 140 receives a trip request, the trip management module 140 determines, from the driver inventory data store 186, which drivers are potential candidates to pick up the rider for the newly created trip. When the network system 130 marks a trip record as complete, the network system 130 can add the driver back into the inventory of available drivers in the driver inventory data store 186).

Figure 2:
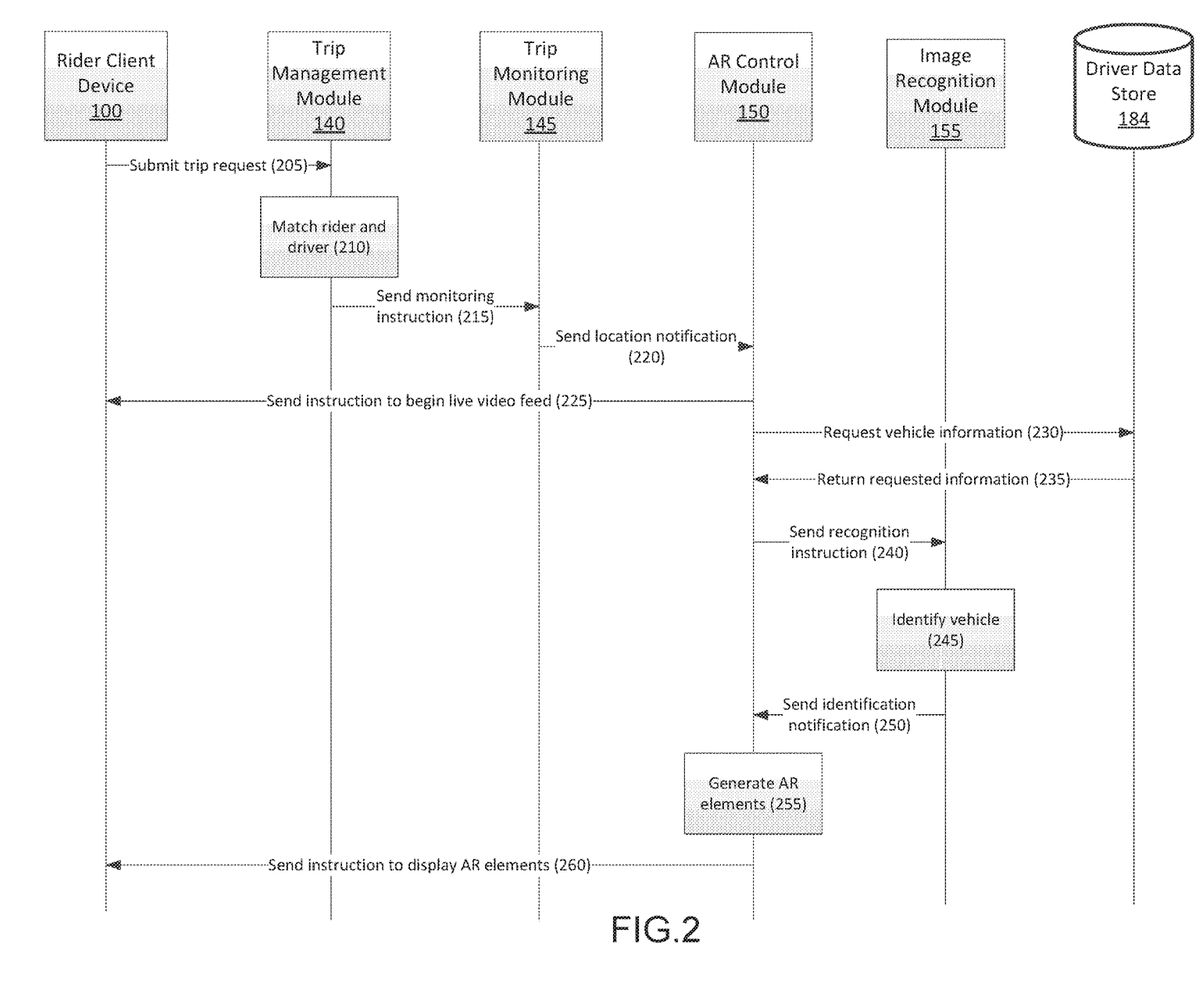
FIG. 2 is an interaction diagram for providing AR identification of a driver's vehicle, in accordance with an embodiment.

FIG. 2 is an interaction diagram for providing AR identification of a driver's vehicle, in accordance with an embodiment. A rider submits 205 a trip request through the rider application 102 for a trip from an origin location to a destination location. The origin location may be a location inputted by the rider or may correspond to the current location of the rider client device 100. The trip management module 140 receives the trip request and uses information from the trip request to match 210 the rider with one of a plurality of available drivers.

Responsive to the driver accepting an invitation message from the trip management module 140 to fulfill the trip request, the trip management module 140 instructs 215 the trip monitoring module 145 to monitor the driver's location as the driver travels from his current location to the pickup location. The trip monitoring module 145 uses a location determination module on the driver client device 110 to monitor the location of the driver's vehicle and/or telematics information (e.g., indications of current speed) and notifies 220 the AR control module 150 when the vehicle is within a threshold distance of the pickup location.

Responsive to receiving the notification from the trip monitoring module 145, the AR control module 150 sends 225 an instruction to the rider client device 100 to display a live video feed using the camera on the rider client device 100 and queries 230 the driver data store 184 for driver information associated with the driver. The driver information includes information about the driver as well as the driver's vehicle and includes at least the year, make, model, color, and license plate state and number of the vehicle as well as the driver's name, photograph, and/or rating. In some embodiments, the driver information also includes a designation of whether the driver is associated with an indication device.

The driver data store 184 returns 235 the requested information to the AR control module 150. At 240, the AR control module 150 sends the driver information to the image recognition module 155, along with an instruction to monitor the live video feed to identify the driver's vehicle as it enters the line of sight of the rider client device 100.

The image recognition module 155 uses a trained model to predict a likelihood that an approaching vehicle is the driver's vehicle, as discussed above with respect to FIG. 1. In one embodiment, the model determines a vehicle score for an approaching vehicle based on the make, model, and color of an approaching vehicle as well as the license plate state and number. Additionally or alternatively, the vehicle score may also by based on the presence or absence of trade dress associated with the network system and/or illumination of an indication device in the rider-specified output configuration. In some embodiments, the model also compares the current time with the DETA at the pickup location to determine the vehicle score. For example, if the DETA at the pickup location is three minutes from the current time, the model will assign a lower vehicle score than if the DETA were less than a minute.

Responsive to the vehicle score for an approaching vehicle exceeding a vehicle score threshold, the image recognition module 155 identifies 245 the vehicle as the driver and notifies 250 the AR control module 150 of the vehicle's location. The AR control module 150 then generates 255 AR elements to display on the rider client device 100 based on the geographic location, camera direction, and tilt of the rider client device 100 as well as, optionally, the RSS of radio signals exchanged between the rider client device 100 and the driver client device 110. At 260, the AR control module 150 sends an instruction to the AR application on the rider client device 100 to display the AR elements. For example, responsive to the image recognition module 155 notifying the AR control module 150 of the location of the driver's vehicle, the AR control module 150 might instruct the AR application to highlight the driver's vehicle as it approaches the pickup location and, optionally, to display other AR elements (e.g., text, navigational elements) notifying the rider of the driver's location. In other embodiments, if both the rider and the driver are associated with an indication device, the AR elements also include a graphical representation of the indication device based on the rider-specified output configuration.

FIG. 3 illustrates an example captured image 302 displayed in a user interface of a rider client device 100. The captured image 302 is augmented with AR elements identifying the driver's vehicle, in accordance with an embodiment. Using the geographic position, camera direction, and tilt of the rider client device 100, the AR control module 150 selects computer-generated AR elements to display on the rider client device. In the captured image 302, the rider client device 100 displays an image of a road including a vehicle approaching the location of the rider client device 100. The captured image 302 is overlaid by graphical and textual elements intended to identify the vehicle as the driver, including a graphical overlay in the shape of the vehicle 304 and a text box 306 including the driver's name, photograph, and license plate number. In one embodiment, the vehicle is displayed in a highlighted manner in the user interface display. In some embodiments, the AR elements also include a graphical representation of a personalized output configuration of an indication device. For example, if the rider-specified configuration consisted of a blinking green light, the AR control module 150 would instruct the AR application to display a blinking green light on the driver's vehicle as it approached the pickup location.

Figure 4:
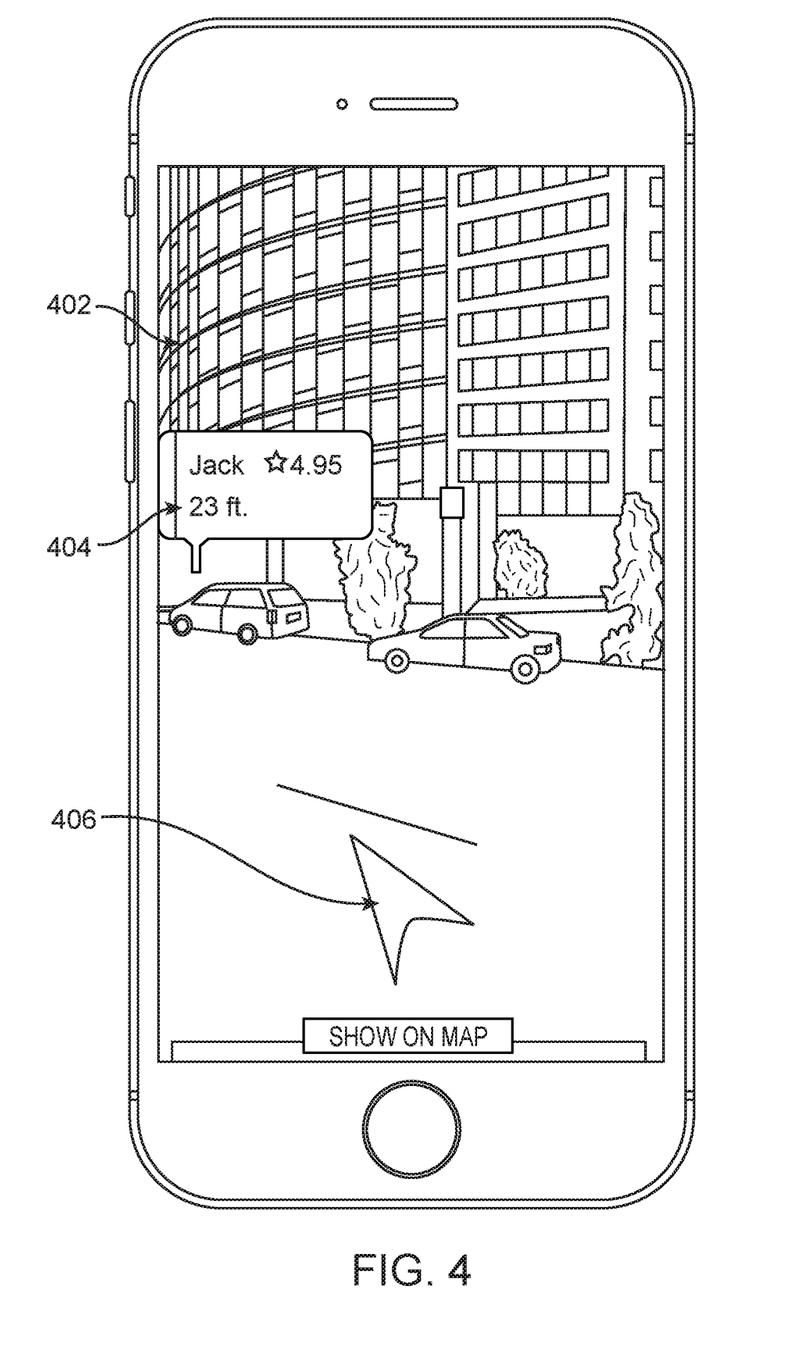
FIG. 4 illustrates an example captured image augmented with AR identification of a stationary vehicle, in accordance with an embodiment.

FIG. 4 illustrates an example captured image 402 displayed in a user interface of a rider client device 100. The captured image 402 is augmented with AR elements identifying a stationary driver vehicle, in accordance with an embodiment. The captured image 402 is overlaid by graphical and textual elements intended to identify the vehicle as the driver, including a text box 404 including the driver's name and rating and the distance from the current location of the rider client device 100 to the vehicle. In some embodiments, the AR elements also include navigational elements. For example, in the captured image 402, the AR control module 150 generates for display an arrow pointing to the driver's vehicle. Depending on the geographic position, camera direction, and tilt of the rider client device 100, the AR control module 150 generates different navigational elements directing the rider to the vehicle. Additionally or alternatively, graphical AR elements might include a graphical overlay in the shape of the vehicle and/or a graphical representation of an indication device.

Figure 5:
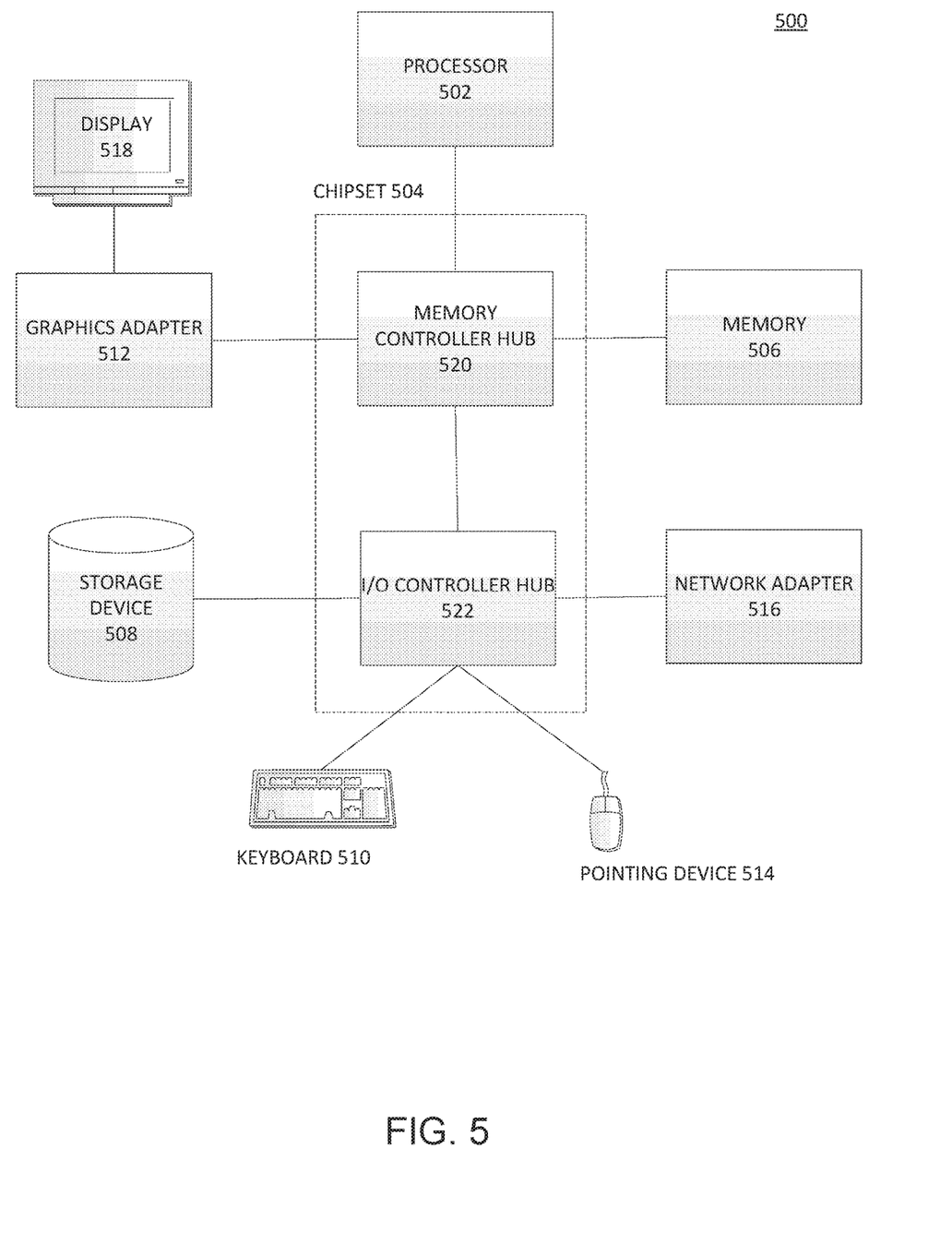
FIG. 5 illustrates example components of a computer used as part or all of the network system, the rider client device, and/or the driver client device, in accordance with an embodiment.

FIG. 5 is a block diagram illustrating physical components of a computer 500 used as part or all of the network system 130, rider client device 100, or driver client device 110 from FIG. 1, in accordance with an embodiment. Illustrated are at least one processor 502 coupled to a chipset 504. Also coupled to the chipset 504 are a memory 506, a storage device 508, a graphics adapter 512, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500, such as a host or smartphone, may lack a graphics adapter 512, and/or display 518, as well as a keyboard 510 or external pointing device 514. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

The foregoing description has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations while described functionally computationally or logically are understood to be implemented by computer programs or equivalent electrical circuits microcode or the like. Furthermore, it has also proven convenient at times to refer to these arrangements of operations as modules without loss of generality. The described operations and their associated modules may be embodied in software firmware hardware or any combinations thereof.

Any of the steps operations or processes described herein may be performed or implemented with one or more hardware or software modules alone or in combination with other devices. In one embodiment a software module is implemented with a computer program product comprising a computer-readable medium containing computer program code which can be executed by a computer processor for performing any or all of the steps operations or processes described.

Embodiments may also relate to an apparatus for performing the operations herein. This apparatus may be specially constructed for the required purposes and/or it may comprise a general-purpose computing device selectively activated or reconfigured by a computer program stored in the computer. Such a computer program may be stored in a non-transitory tangible computer readable storage medium or any type of media suitable for storing electronic instructions which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process where the information is stored on a non-transitory tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description but rather by any claims that issue on an application based hereon. Accordingly, the disclosure of the embodiments of the invention is intended to be illustrative but not limiting of the scope of the invention which is set forth in the following claims.

The invention claimed is:

1. A computer-implemented method for providing augmented reality identification of a vehicle comprising:
   receiving, at a network system including one or more processors, from a computing device associated with a rider, a set of service data, the set of service data including an origin location and a request for a driver to transport the rider from the origin location;
   matching the rider with one of a plurality of available drivers, the driver associated with a vehicle and a computing device;
   monitoring a location of the vehicle based on location information received from the driver computing device;
   responsive to determining that the vehicle is within a threshold distance of a pickup location associated with the origin location, instructing the rider computing device to display a live video feed, the video feed being captured by a camera on the rider computing device;
   comparing a plurality of characteristics of an approaching vehicle with stored information associated with the vehicle to determine a vehicle score, the plurality of characteristics including an estimated time of arrival of the vehicle at the pickup location;
   responsive to the vehicle score exceeding a vehicle score threshold, identifying the approaching vehicle as the vehicle; and
   instructing an augmented reality application on the computing device to visually augment the video feed with augmented reality elements indicating the vehicle.

2. The computer-implemented method of claim 1, further comprising identifying driver information associated with the driver and the vehicle.

3. The computer-implemented method of claim 2, wherein the driver information includes a designation of whether the driver is associated with an indication device configured to receive a rider-specified output configuration.

4. The computer-implemented method of claim 1, wherein the augmented reality elements include one or more of images, video, text, and graphics.

5. The computer-implemented method of claim 1, wherein the augmented reality elements include a graphical overlay in a shape of the vehicle.

6. The computer-implemented method of claim 1, wherein the augmented reality elements include a graphical representation of a rider-specified output configuration for an indication device.

7. The computer-implemented method of claim 1, further comprising:
   instructing the rider computing device and the driver computing device to transmit unique radio signals and report received radio signals to the network system; and
   responsive to the signal strength of the received radio signals exceeding a signal strength threshold, determining that the driver computing device is within a threshold distance of the pickup location.

8. A non-transitory computer-readable storage medium storing computer-executable instructions that, in response to executing, cause a device comprising a processor to perform operations, comprising:
   receiving, at a network system including one or more processors, from a computing device associated with a rider, a set of service data, the set of service data including an origin location and a request for a driver to transport the rider from the origin location;
   matching the rider with one of a plurality of available drivers, the driver associated with a vehicle and a computing device;
   monitoring a location of the vehicle based on location information received from the driver computing device;
   responsive to determining that the vehicle is within a threshold distance of a pickup location associated with the origin location, instructing the rider computing device to display a live video feed, the video feed being captured by a camera on the rider computing device;
   comparing a plurality of characteristics of an approaching vehicle with stored information associated with the vehicle to determine a vehicle score, the plurality of characteristics including an estimated time of arrival of the vehicle at the pickup location;

responsive to the vehicle score exceeding a vehicle score threshold, identifying the approaching vehicle as the vehicle; and instructing an augmented reality application on the computing device to visually augment the video feed with augmented reality elements indicating the vehicle.

9. The non-transitory computer-readable storage medium of claim 8, further comprising identifying driver information associated with the driver and the vehicle.

10. The non-transitory computer-readable storage medium of claim 9, wherein the driver information includes a designation of whether the driver is associated with an indication device configured to receive a rider-specified output configuration.

11. The non-transitory computer-readable storage medium of claim 8, further comprising:

instructing the rider computing device and the driver computing device to transmit unique radio signals and report received radio signals to the network system; and responsive to the signal strength of the received radio signals exceeding a signal strength threshold, determining that the driver computing device is within a threshold distance of the pickup location.

12. A computer system comprising:

one or more computer processors for executing computer program instructions; and a non-transitory computer-readable storage medium storing instructions executable by the one or more computer processors to perform steps comprising:

receiving at a network system including one or more processors, from a computing device associated with a rider, a set of service data, the set of service data including an origin location and a request for a vehicle to transport the rider from the origin location;

matching the rider with one of a plurality of available vehicles;

monitoring a location of the vehicle;

responsive to determining that the vehicle is within a threshold distance of a pickup location associated with the origin location, instructing the rider computing device to display a live video feed, the video feed being captured by a camera on the rider computing device;

comparing a plurality of characteristics of an approaching vehicle with stored information associated with the vehicle to determine a vehicle score, the plurality of characteristics including an estimated time of arrival of the vehicle at the pickup location;

responsive to the vehicle score exceeding a vehicle score threshold, identifying the approaching vehicle as the vehicle; and instructing an augmented reality application on the rider computing device to visually augment the video feed with augmented reality elements indicating the vehicle.

13. The computer system of claim 12, further comprising identifying vehicle information associated with the vehicle.

14. The computer system of claim 12, further comprising:

instructing the rider computing device and an on-board computing system of the vehicle to transmit unique radio signals and report received radio signals to the network system; and responsive to the signal strength of the received radio signals exceeding a signal strength threshold, determining that the vehicle is within a threshold distance of the pickup location.

\* \* \* \* \*